Patented Feb. 23, 1932

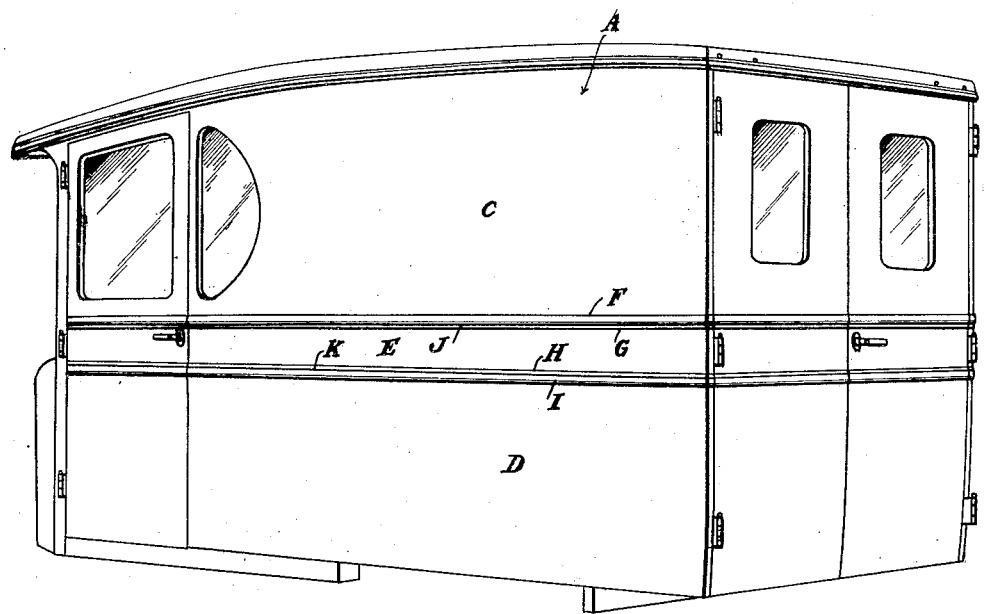
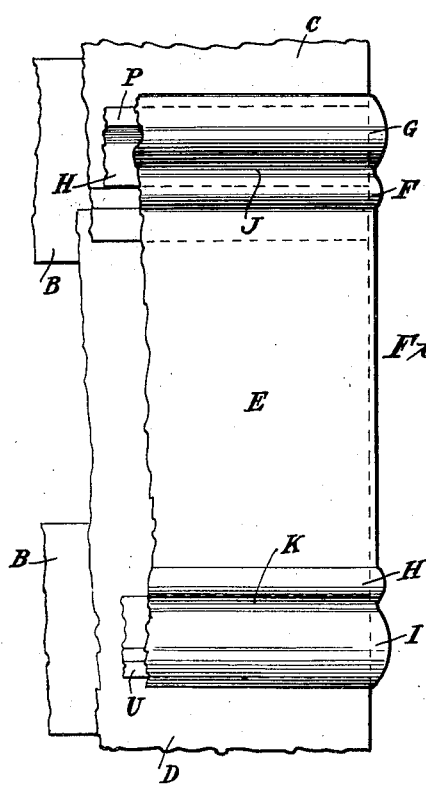
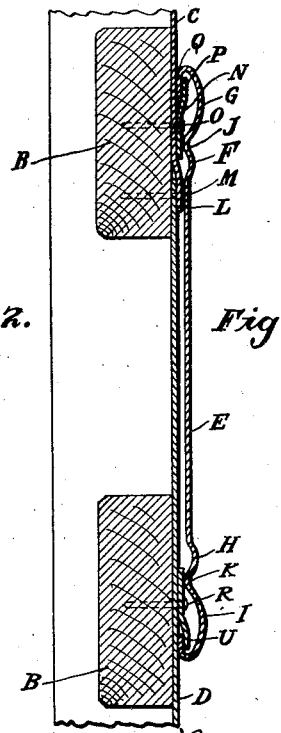

1,847,041

UNITED STATES PATENT OFFICE

FREDERICK M. SMALL, OF YORK, PENNSYLVANIA, ASSIGNOR TO MARTIN-PARRY CORPORATION, OF YORK, PENNSYLVANIA, A CORPORATION OF DELAWARE

VEHICLE BODY

Application filed March 15, 1928. Serial No. 261,846.

This invention relates to vehicle bodies.

The primary object of the invention is to provide a preformed belt or molding panel of a pleasing appearance which is adapted to be secured to a body with a minimum of ease and expense, and which is economical in construction.

More specifically, the invention embraces a belt panel which is provided with preformed corrugations formed therein, producing longitudinally extending beads of ornamental appearance, which panel obscures nails or other fastening devices employed in the construction of vehicle bodies.

Specifically, the invention has for its further object the provision of molding retainers behind which inturned portions of the belt or molding panel engage, whereby the preformed belt panel may be slid into its operative position with respect to the body.

Numerous other additional and subordinate characteristics of the invention will be apparent to those skilled in the art from a reading of the following specification in conjunction with the drawings attached hereto and forming a part hereof in which, Fig. 1 is a side elevation of the vehicle body having the molding strip applied thereto.

Fig. 2 is a fragmentary view showing the details of the construction, and,

Fig. 3 is a transverse section.

Referring now more specifically to the drawings, A represents a commercial vehicle body, although the present invention is applicable to and may be advantageously employed in uses other than bodies. B is body rails of the body. C is the sheet metal top body panel and D is the sheet metal bottom body panel.

The molding panel E, constituting an important characteristic of the invention, is of considerable height as will be observed from the drawings and is longitudinally corrugated to produce upper and lower pairs of beading, preferably of varying sizes, as indicated by reference numerals F and G, and H and I, respectively. These corrugations may be of different sizes and depths, as shown in the drawings, and they preferably form inwardly extending longitudinally disposed corrugations J and K for the purpose to be hereinafter described. These convex beads produced by the corrugations lend an extremely ornamental appearance to the body, as shown in Fig. 1, for instance.

The upper and lower body panels C and D respectively, as shown, overlap as at L and are secured together by a nail or other fastening device M. The upper molding retainer N is likewise nailed or otherwise secured to the body rails as at O and has an outwardly flared portion P behind which the inturned flange Q engages. The lower panel D has secured to it a similarly formed molding retainer U fastened as at R. The inturned projections J and K, respectively, abuttingly engage the sides of the retainer clips, and the marginal flanges at the top and bottom respectively of the belt panel are thereby resiliently maintained in place behind the retainers.

It will be obvious from the above description that the belt or molding panel may be easily applied to the body by merely slipping the end thereof behind the retainers in such a manner that it extends continuously around the body. This body panel is, as stated, made in a separate piece, and in addition to presenting an ornamental appearance, it thoroughly obscures the nails or other fastening devices necessary to secure the top and bottom panels to the body rails.

It will be apparent to those skilled in the art that this conception is not necessarily restricted to the motor vehicle art, but it may be advantageously employed in connection with any uses requiring such a construction.

Having thus described my invention, what I claim is:

A vehicle body comprising upper and lower panels with means for securing them to the body, spaced retainers secured to said body and panels and being outwardly flared and extending in reverse directions, a unitary preformed combined belt panel and molding provided with inturned marginal lips engaging said retainers and resiliently maintained in position with respect to the same, said belt panel being corrugated at its upper and lower edges, respectively, whereby to shape exteriorly rounded convex portions simulating independent spaced beadings, and inwardly projecting portions formed in said preformed unit engaging said body to maintain the marginal lips of the unit in resilient engagement with said retainers.

In testimony whereof I affix my signature.

FREDERICK M. SMALL.